Nov. 8, 1932.  F. PONTON  1,886,582
TRAY SUPPORT
Filed March 16, 1931   2 Sheets-Sheet 1
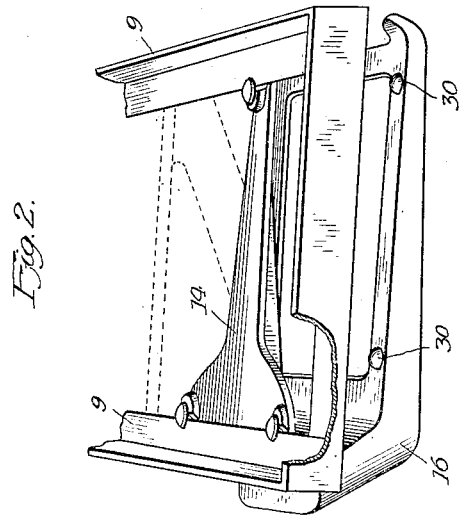
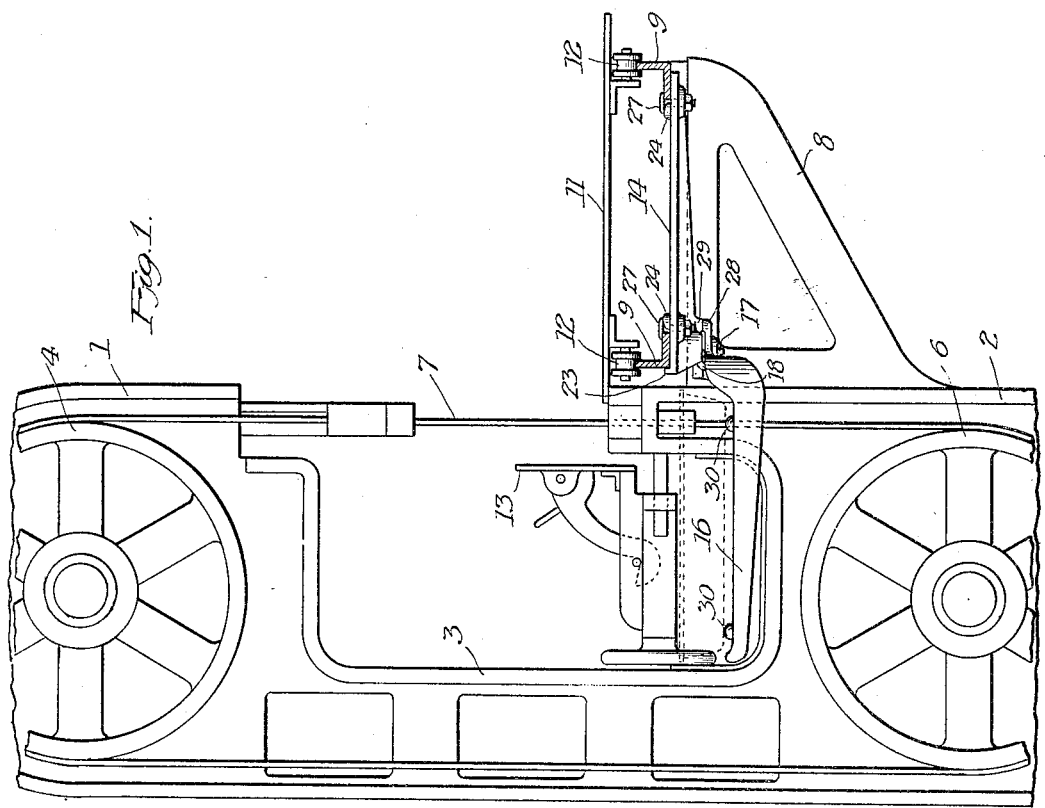
Inventor
Fortunat Ponton
By Wilson, Dowell, McCanna & Rehm
Attys.

Nov. 8, 1932.   F. PONTON   1,886,582
TRAY SUPPORT
Filed March 16, 1931   2 Sheets-Sheet 2
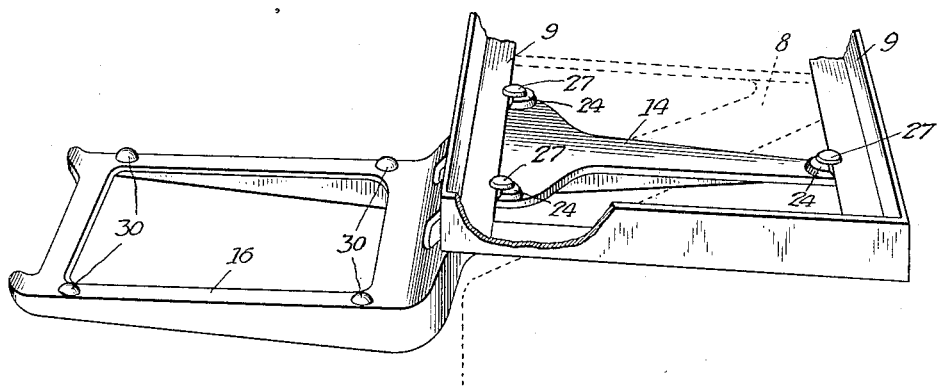
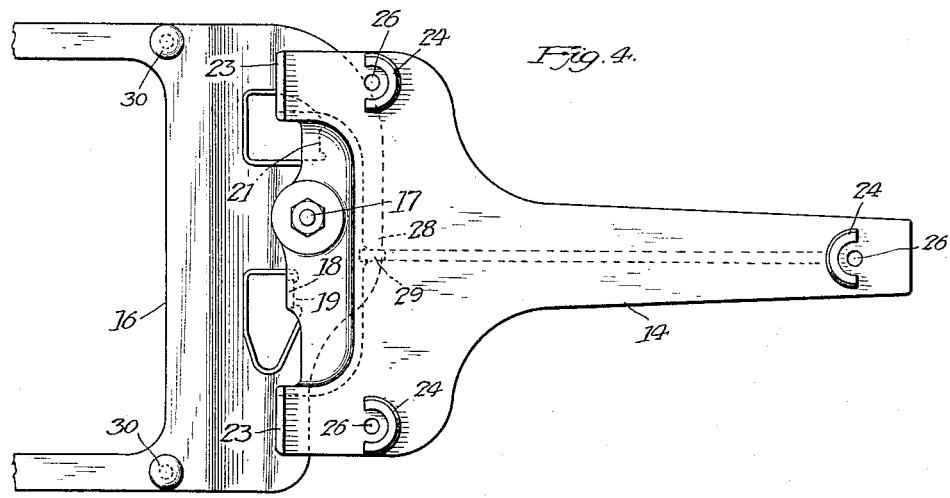
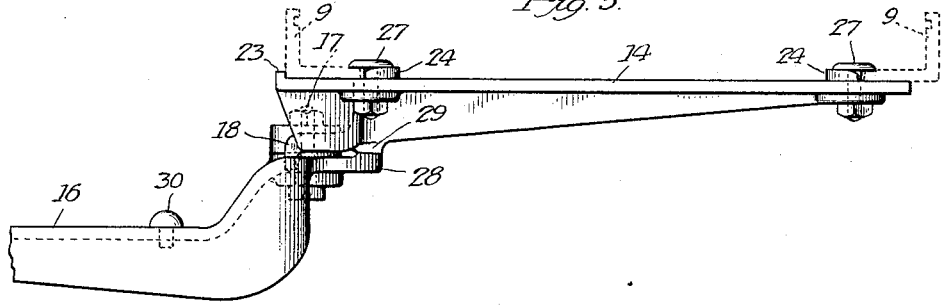
Inventor
Fortunat Ponton
By Wilson, Dowell, McKenna & Rehm
Attys Patented Nov. 8, 1932

1,886,582

UNITED STATES PATENT OFFICE

FORTUNAT PONTON, OF CHICAGO, ILLINOIS, ASSIGNOR TO VAUGHAN COMPANY, OF CHICAGO, ILLINOIS, A CORPORATION OF ILLINOIS

TRAY SUPPORT

Application filed March 16, 1931. Serial No. 523,016.

This invention relates to cutting machines in general and has particular application to a meat and bone cutting machine of the type disclosed in the patent to Jay W. Vaughan No. 1,511,788 issued October 14, 1924.

Machines of this type are particularly well adapted to cut meats such as cuts of steaks from sections of beef or similar cuts from other meats. It is desirable in the use of machines of this character to have a pan or tray conveniently situated with respect to the cutting tool into which the cut slices may be placed.

It is the purpose of this invention therefore to provide a support which will hold a pan in suitable position relatively to the cutting tool and into which the cut slices may conveniently fall or be placed. It is preferable if not necessary that the pan supporting member should not interfere with the cutting tool either during the cutting operation or during replacement or adjustment of the cutting tool. It is therefore within the contemplation of this invention to provide a support for a pan which will not interfere with either the cutting operation or any repairs to the cutting tool and furthermore to provide such a support which may be adopted to present machines as they are manufactured as well as to new machines particularly adapted to receive this support.

In accordance with this invention a pivoted support is employed which may be swung into operative position to carry a tray at a convenient location adjacent the cutting tool and which may also be swung into inoperative position to permit access to the cutting tool or for repairs and which will occupy very little space and be conveniently located for shipping purposes.

Other and further objects and their resultant advantages will be apparent from the following description given in connection with the drawings in which:

Fig. 1 is a rear elevation of a portion of a meat cutting machine having a tray or pan support embodying the principles of this invention secured thereto, the support being illustrated in operative position.

Fig. 2 is a fragmentary perspective of the work table support and associated pan support, the latter being shown in inoperative position.

Fig. 3 is a fragmentary perspective of the work table support and associated pan support shown in operative position.

Fig. 4 is a plan view of the pan support, and

Fig. 5 is a side elevation of the pan support illustrating its manner of attachment to a work table support.

Referring more particularly to the drawings, there is illustrated a meat cutter of the band saw type although it is manifest that this invention may be applied to cutting machines of other types.

In the illustrated form of this invention, the cutting machine is illustrated in part only and as shown comprises an upper frame portion 1 and a lower frame portion 2 joined together by a central web portion 3. The upper frame portion houses a band wheel 4 and the lower frame houses a lower band wheel 6 over which a band saw 7 is stretched being driven by one of the wheels, usually the lower.

Secured to the lower frame section adjacent the front stretch of the band saw is a bracket 8 which comprises the main support for a work table. Secured to bracket 8 are a pair of horizontal tracks 9 which serve as runways for the work table 11, the latter being supplied with rollers 12 which travel upon tracks 9. It is obvious that the work table 11 is movable toward and from the band saw 7 along one side thereof, in the usual manner. Disposed upon the other side of the band saw is an adjustable gauge 13.

The pan support comprises a generally T-shaped bracket arm 14 and a rectangular shaped bracket arm 16, pivotally joined together at one end of each by a pivot bolt 17 disposed to the rear of the back edge of the saw blade. Accordingly the two arms may be swung together so that one bracket is superposed above the other as shown in Fig. 2 when in inoperative position or they may be swung into extended position as shown in Figs. 1 and 3 so that one is substantially a continuation of the other when in operative position.

In order to limit the relative pivotal movement of the two arms 14 and 16 to 180°, arm 14 is provided with a depending stop lug 18 which engages an abutment surface 19 formed in arm 16, the lug 18 and surface 19 lying upon one side of pivot 17. Arm 16 is also provided with an abutment surface 21 upon the other side of pivot 17 which surface engages stop 18 which prohibits more than 180° movement in the other direction between the two bracket arms 14 and 16.

Bracket arm 14 is arranged to be secured to the work table support adjacent its rear end (Fig. 3) so as to bring the tray support to the rear of the saw blades by being clamped to tracks 9. For this purpose the ends of the head of the T-shaped arm 14 are provided with upwardly extending lugs 23 which engage the outer surface of one rail 9 to accurately position arm 14 thereagainst. Arm 14 is provided at each end with raised bosses 24 drilled as at 26 to permit the passage of securing bolts 27 having enlarged deformed heads to engage lower flanges of rails 9 and securely clamp arm 14 thereto.

In order to retain bracket arms either in operative or inoperative position, bracket 16 is provided with an extending finger 28 which is arranged to frictionally engage a depending projection 29 formed on bracket 14 and lock the two arms in either operative or inoperative position. This contact also serves to brace arm 16 when in open position. Arm 16 may be provided with rubber bumpers 30 to protect the pan and prevent it from slipping.

From the foregoing description it will be apparent that the pan support provides means for supporting a pan in convenient position adjacent the cutting tool to receive the slices of meat or material as it is severed by the band saw. For cleaning or adjusting purposes arm 16 may be swung about pivot 17 into a position immediately below the support and below the associated arm 14, thus the support may be readily swung into operative or inoperative position at will. The entire support may be adjusted along rails 9 to the most convenient location.

It is obvious that many changes may be made in the details of construction without departing from the spirit and scope of this invention as defined in the following claims.

I claim:

1. In a cutting machine of the class described, a cutting tool, a work table support adjacent said tool, a work table slidable on said support toward and from said tool and a tray support secured to said table support, a portion of said tray support being movable into operative position adjacent said cutting tool and into inoperative position away from said tool to permit access thereto.

2. In a cutting machine of the class described, a cutting tool, a work table support adjacent said tool, a work table slidable on said support toward and from said tool and a tray support adapted to support a tray adjacent said tool, said tray support comprising a pair of arms pivotally connected, one of said arms being secured to said support, the other of said arms being movable into a position upon the other side of said tool from said work table.

3. In a cutting machine of the class described, a cutting tool, a work table support adjacent said tool, a work table slidable on said support toward and from said tool and a tray support adapted to support a tray adjacent said tool, said tray support comprising a pair of arms pivotally connected to each other, means for securing one of said arms to said work table support and means for limiting the pivotal movement of the other arm to substantially 180°.

4. In a cutting machine of the class described, a cutting tool, a work table support adjacent said tool, a work table slidable on said support toward and from said tool and a tray support adapted to support a tray adjacent said tool, said tray support comprising a pair of arms pivotally connected to each other, means for securing one of said bracket arms to said work table support and means for locking said movable arm in extended position.

5. In a cutting machine of the class described, a cutting tool, a work table support adjacent said tool, a work table slidable on said support toward and from said tool and a tray support adapted to support a tray adjacent said tool, said tray support comprising a pair of arms pivotally connected to each other, means for securing one of said bracket arms to said work table support, means for limiting the pivotal movement of the other arm to substantially 180° and means for locking said movable arm in extended position.

6. In a cutting machine of the class described, a cutting tool, a work table support adjacent said tool, a work table slidable on said support toward and from said tool and a tray support adapted to support a tray adjacent said tool, said tray support comprising a pair of arms pivotally connected to each other, means for securing one of said bracket arms to said work table support and means for locking said movable arm in retracted position.

7. In a cutting machine of the class described, a cutting tool, a work table support adjacent said tool, a work table slidable on said support toward and from said tool and a tray support adapted to support a tray adjacent said tool, said tray support comprising a pair of arms pivotally connected to each other, means for securing one of said bracket arms to said work table support, means for limiting the pivotal movement of the other arm to substantially 180° and means for locking said movable arm in retracted position.

8. In a cutting machine of the class described, a cutting tool, a work table support adjacent said tool, a pair of tracks secured to said support, a work table slidable on said tracks toward and from said tool and a tray support secured to said tracks, said tray support having a tray supporting arm extending in proximity to said cutting tool.

9. In a cutting machine of the class described, a cutting tool, a work table support adjacent said tool, a pair of tracks secured to said support, a work table slidable on said tracks toward and from said tool and a tray support secured to said tracks, said tray support having a pivoted arm movable into a position adjacent said cutting tool.

10. In a cutting machine of the class described, a cutting tool, a work table support adjacent said tool, a pair of tracks secured to said support, a work table slidable on said tracks toward and from said tool and a tray support secured to said tracks, said tray support having a pivoted arm movable into a position adjacent said cutting tool and retractable to a position beneath said work table.

In witness of the foregoing I affix my signature.

FORTUNAT PONTON.